Patented Dec. 12, 1922.

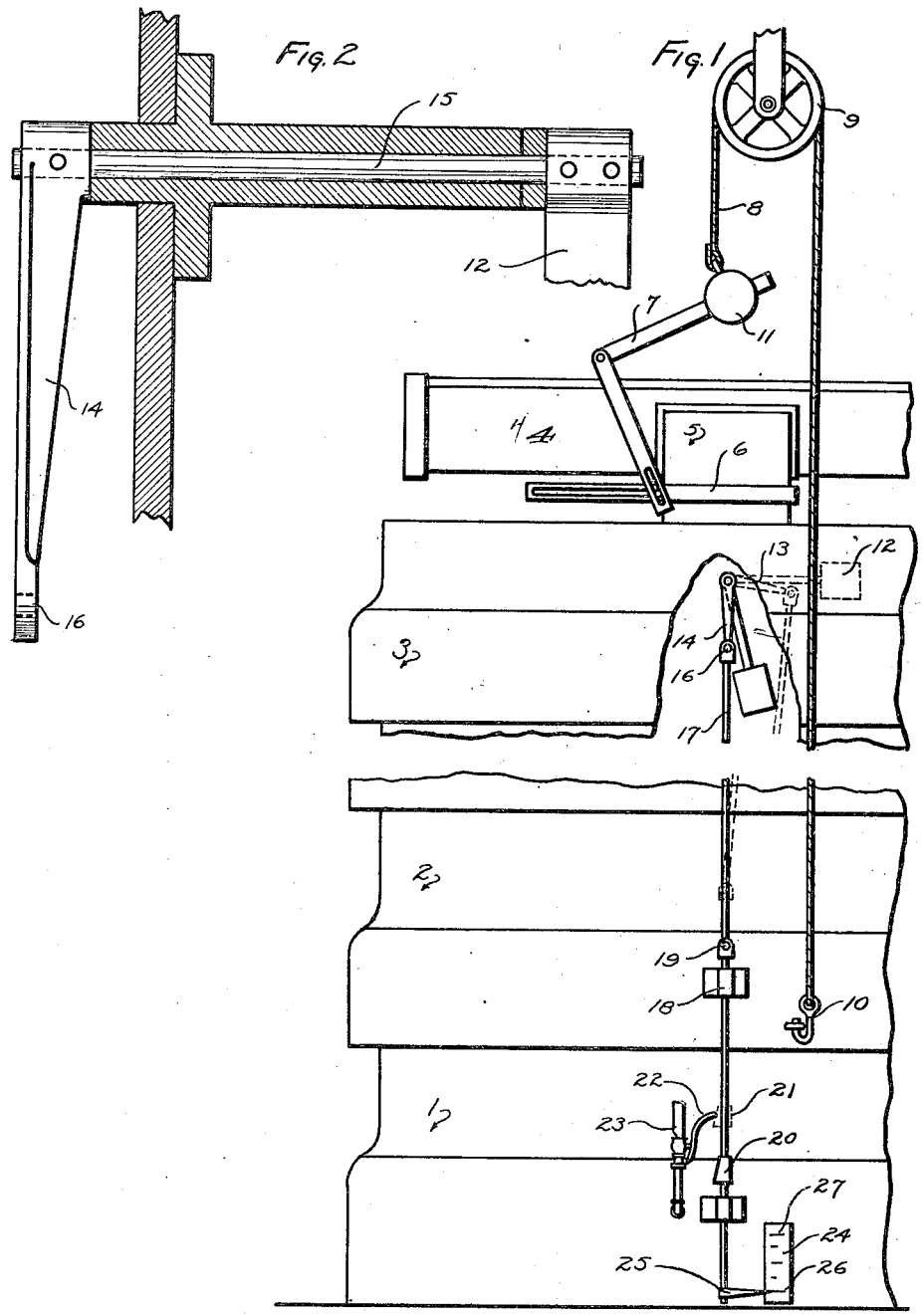

1,438,406

UNITED STATES PATENT OFFICE.

ORLANDO SHEPPARD, JR., OF ATLANTA, GEORGIA, AND RUSSELL A. TRACE, OF DAYTON, OHIO, ASSIGNORS TO BUCKEYE IRON & BRASS WORKS, OF DAYTON, OHIO, A CORPORATION OF OHIO.

OVERHEAD FEED ALARM.

Application filed March 28, 1921. Serial No. 456,455.

*To all whom it may concern:*

Be it known that we, ORLANDO SHEPPARD, Jr., and RUSSELL A. TRACE, citizens of the United States, residing, respectively, at Atlanta, in the county of Fulton and State of Georgia, and at Dayton, in the county of Montgomery and State of Ohio, have invented certain new and useful Improvements in Overhead Feed Alarms, of which the following is a specification, reference being had therein to the accompanying drawing.

Our invention relates to cookers for oil bearing material and in particular to a means of indicating when the flow of oil bearing material to the topmost kettle of the cooker must be cut off.

The object of our invention is to provide a simple alarm depending upon the height of the meal in the topmost cooker which will indicate to the operator adjacent the bottom kettle the proper time to close the feeding mechanism for supplying oil bearing material to the top kettle. It is also our object to provide a means in combination with the above mechanism for showing the depth of the material at any time to notify the operator that the material in the kettle must be replenished.

Referring to the drawings:

Fig. 1, is a side elevation of the complete apparatus;

Fig. 2, is a section enlarged showing the method of connection of the alarm to the float that rides on the top of the meal in the topmost cooker.

In detail, 1 is a cooker upon which the cookers 2 and 3 are imposed. Upon the top of the cookers is a conveyor 4 with a hopper 5 controlled by a gate 6 which determines the movement of the meal out of 4 through 5 into 3. This gate is closed by the bell crank 7, to which is connected the rope 8 passing over the pulley 9. When it is desired to cut off the flow of meal from the conveyor 4 to the topmost kettle 3, the operator pulls the rope 8 which closes the gate 6.

When the meal gets to a predetermined height it will carry with it the float 12 and by doing so will lift the arm 13 to which it is attached and thereby lift the arm 14 to which it is attached through the shaft 15. This arm 14 is connected at 16 to a rod 17 that travels in the guides 18. This rod is pivoted at 19. Upon the rod is a cam lug 20, the cam face 21, which, as the lug passes upwardly on the rod, comes in contact with the whistle arm 22 that actuates the whistle 23 to notify the operator to shut off the supply of meal in the topmost cooker, which he does by pulling the rope 8 as above described.

24 is a scale and 25 is a pointer to indicate whether the top kettle is empty or full. When empty the pointer 25 will be opposite the part 26, and when full 25 is opposite 27.

While we have shown and described certain features as constituting our invention, it will be understood that parts have been shown for purposes of illustration only, and that we do not desire to be limited to such details, as obvious modifications will occur to a person skilled in the art.

Having thus fully described our invention, what we claim as new and desire to secure by Letters Patent, is:—

1. In a cooker, a plurality of kettles superimposed above one another, means for delivering material to the topmost kettle, means of regulating the delivery of material to the topmost kettle, means in the topmost kettle for indicating on the outside thereof the height of the material in said kettle, and means on said indicator for actuating an audible alarm to direct the operator's attention to the height of the material in the kettle, whereby he can be advised when to cut off the supply of material.

2. In a cooker, a plurality of kettles superimposed above one another, means for delivering material to the topmost kettle, means of regulating the delivery of material to the topmost kettle, means in the topmost kettle for indicating on the outside thereof the height of the material in said kettle, means on said indicator for actuating an alarm to direct the operator's attention to the height of the material in the kettle, and means of regulating the flow of material in the topmost kettle.

3. In combination, a plurality of kettles superimposed above one another, means of delivering oil bearing material to the topmost kettle, a gate in said delivery means, means of maintaining said gate open, means of maintaining said gate shut, a float in the topmost kettle connected to an actuating means on the exterior thereof, an actuating means, an alarm on the exterior of said cooker, and means on said actuating means for actuating said alarm when the height of material in the topmost cooker reaches a predetermined point.

4. In combination, a plurality of kettles superimposed one above the other, an overhead feed, a gate in said overhead feed to control the delivery of material therefrom to the topmost kettle, a weight to normally keep said gate open, a rope attached to said weight passing to a point adjacent to the operator of the cooker so that the gate may be closed, a float in the topmost kettle of the cooker connected to a cross shaft, a cross shaft, a lever on the outside of said cooker connected thereto, a rod pivoted to said lever, means of guiding said rod on the outside of said cooker, an actuating lug on said rod, a whistle on said cooker adapted to be actuated by said lug on the operating rod, whereby when the material in the topmost cooker reaches a predetermined level the operator will be notified and the gate delivering material can be closed.

In testimony whereof, we affix our signatures.

ORLANDO SHEPPARD, Jr.
RUSSELL A. TRACE.